(12) United States Patent
Wilke et al.

(10) Patent No.: US 12,104,642 B2
(45) Date of Patent: Oct. 1, 2024

(54) FLEXIBLE FASTENER CAPTIVATOR

(71) Applicant: Western Digital Technologies, Inc., San Jose, CA (US)

(72) Inventors: Jeff Wilke, Palmer Lake, CO (US); Bart Carter, Pueblo, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 2 days.

(21) Appl. No.: 17/750,219

(22) Filed: May 20, 2022

(65) Prior Publication Data
US 2023/0375019 A1 Nov. 23, 2023

(51) Int. Cl.
*F16B 5/02* (2006.01)

(52) U.S. Cl.
CPC .................. *F16B 5/0208* (2013.01)

(58) Field of Classification Search
CPC ....... F16B 41/002; F16B 5/0208; F16B 37/14
USPC .................................................. 411/377, 999
See application file for complete search history.

(56) References Cited

U.S. PATENT DOCUMENTS

| | | | | |
|---|---|---|---|---|
| 2,707,774 A * | 5/1955 | Keller | ................. | H01R 9/2491 |
| | | | | 439/814 |
| 3,218,906 A * | 11/1965 | Dupree | ................. | F16B 41/002 |
| | | | | 411/533 |
| 3,561,075 A * | 2/1971 | Selinko | ................... | F16B 5/065 |
| | | | | 24/694 |
| 5,851,095 A | 12/1998 | Ellis et al. | | |
| 6,238,155 B1 | 5/2001 | Aukzemas et al. | | |
| 8,523,505 B2 * | 9/2013 | Opper | ................ | H01R 13/6215 |
| | | | | 411/914 |
| 8,950,991 B2 | 2/2015 | Trifilio et al. | | |
| 10,082,169 B2 | 9/2018 | Niesley et al. | | |
| 11,927,212 B2 * | 3/2024 | Estridge | ................ | F16B 43/003 |
| 2005/0210721 A1 * | 9/2005 | Blackburn | ............... | A47G 3/00 |
| | | | | 40/200 |
| 2009/0137160 A1 | 5/2009 | Opper et al. | | |

(Continued)

FOREIGN PATENT DOCUMENTS

JP 4578423 B2 11/2010

OTHER PUBLICATIONS

MW Components, Retainers, Panel Screw Retariners—Captive Screw Retainers, 10 pages, downloaded as early as Feb. 25, 2022 from https://www.mwcomponents.com/retainers.

(Continued)

*Primary Examiner* — Sarang Afzali
*Assistant Examiner* — Darrell C Ford
(74) *Attorney, Agent, or Firm* — John D. Henkhaus (57) ABSTRACT

A flexible fastener captivator includes a flange comprising an orifice configured to enable a fastener to pass through and an adhesive, and a flexible cap coupled with the flange and configured to provide operational access to a fastener encapsulated within the cap, where the cap includes a retaining structure configured to hold a separate fastener within the cap. The retaining structure may be configured as a plurality of flexible ledges extending from an inner surface of the cap and having a planar surface configured to support a head of a separate fastener, such as a standard off-the-shelf screw or bolt. Such a captivator can be dimensioned commensurate with the fastener type and size for which its use is intended, and/or captivator strips may be constructed in Rack Units of length.

17 Claims, 10 Drawing Sheets

(56) References Cited

U.S. PATENT DOCUMENTS

| | | |
|---|---|---|
| 2010/0290860 A1 | 11/2010 | Wang |
| 2012/0057947 A1 | 3/2012 | Chiu |
| 2012/0093609 A1* | 4/2012 | Trifilio ................. F16B 5/0208 81/436 |
| 2015/0003932 A1* | 1/2015 | Naylor .................... F16B 37/14 29/525.02 |
| 2018/0335065 A1* | 11/2018 | Wang .................... F16B 37/122 |
| 2020/0080584 A1* | 3/2020 | Roper ................. B29C 45/0001 |
| 2020/0325920 A1 | 10/2020 | Baumgart et al. |
| 2021/0231162 A1 | 7/2021 | Tan et al. |

OTHER PUBLICATIONS

Titgemeyer Gmbh & Co. KG, Captive® self-clinching fasteners, 76 pages, downloaded as early as Feb. 28, 2022 from https://www.titgemeyer.com/fileadmin/titgemeyer/downloads/befestigungstechnik/gewindetraeger/katalog/en/10044EN1019_1_Captive_Einpress_Befestiger.pdf.

Froese, Michelle, Prevent loose hardware with PEM captive panel screws, Fastener Engineering, Jun. 4, 2021, 6 pages, WTWH Media LLC., downloaded from https://fastenerengineering.com/prevent-loose-hardware-with-pem-captive-panel-screws/.

Bossard, Captive Mount Hardware, 1 page, downloaded as early as Feb. 28, 2022 from https://americas.bossard.com/captive-mount-hardware/.

Southco, Inc., Captive Screws, 8 pages, downloaded as early as Feb. 25, 2022 from https://southco.com/en_us_int/fasteners/captive-screws.

* cited by examiner

ADHERE A FASTENER CAPTIVATOR TO A WORKPIECE, THE FASTENER CAPTIVATOR COMPRISING:

(A) A FLANGE COMPRISING AN ORIFICE CONFIGURED TO ALLOW A FASTENER TO PASS THROUGH, AND AN ADHESIVE SIDE INCLUDING AN ADHESIVE WITH WHICH THE FASTENER CAPTIVATOR IS ADHERED TO THE WORKPIECE, AND (B) A FLEXIBLE CAP COUPLED WITH THE FLANGE, THE CAP COMPRISING A RETAINING STRUCTURE CONFIGURED WITHIN TO HOLD A SEPARATE FASTENER WITHIN THE CAP, AND WHEREIN THE CAP IS CONFIGURED TO PROVIDE OPERATIONAL ACCESS TO A FASTENER ENCAPSULATED WITHIN THE CAP

702

INSERT A FASTENER INTO THE FLEXIBLE CAP
704

FIG. 7

FLEXIBLE FASTENER CAPTIVATOR

FIELD OF EMBODIMENTS

Embodiments of the invention may relate generally to equipment rack assemblies, and particularly to captive fasteners.

BACKGROUND

As networked computer systems grow in numbers and capability, there is a need for more storage system capacity. Cloud computing and large-scale data processing further increase the need for digital data storage systems that are capable of transferring and holding significant amounts of data. One approach to providing sufficient data storage in data centers is the use of arrays of data storage devices. Many data storage devices can be housed in an electronics enclosure (sometimes referred to as a "rack"), which is typically a modular unit that can hold and operate independent data storage devices in an array, computer processors, routers and other electronic equipment. Data centers typically include many rack-mountable storage units that are used to store the large amounts of data.

Electronics equipment racks come in many sizes and forms, some of which may be pre-assembled completely for shipment to customers and some of which may be pre-assembled in modules for shipment and final assembly at the customer site. Regardless, it is a common practice to ship racks to customers which are already populated with electronics equipment already installed, or to ship trays of devices along with racks for final installation. Thus, some racks and equipment may be shipped with installation kits to complete the installation procedure. In light of the foregoing, equipment racks and trays are often shipped and/or moved around a site in a non-final assembled state. To accommodate that, rack components are typically shipped with assembly hardware prepared for final assembly, with fasteners and the like retained in position for final assembly. Thus, for this reason as well as for innumerable other scenarios, captive fasteners are a known commodity. However, there is always room for improvement.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to assembly hardware retention such as captive fasteners are described. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

A 19-inch rack is a standardized frame or enclosure for mounting multiple electronic equipment modules, where each module has a front panel that is 19 inches wide (see, e.g., Electronic Industries Association EIA-310 specification). This dimension includes the edges or "ears" that protrude from each side of the equipment, enabling the module to be fastened to the rack frame with screws or bolts. Common uses include computer servers, network hardware, telecommunications equipment, audiovisual production gear, and scientific equipment, for non-limiting examples.

Recall that equipment racks and trays are often shipped and/or moved around a site in a non-final assembled state, and to accommodate that rack components are typically shipped with assembly hardware prepared for final assembly, such as with fasteners and the like retained in position for final assembly. This applies as well to a myriad of other manufactured components that may be provided in a non-final assembled state requiring some effort of final assembly by a customer user.

Flexible Fastener Captivator

Figure 1A:
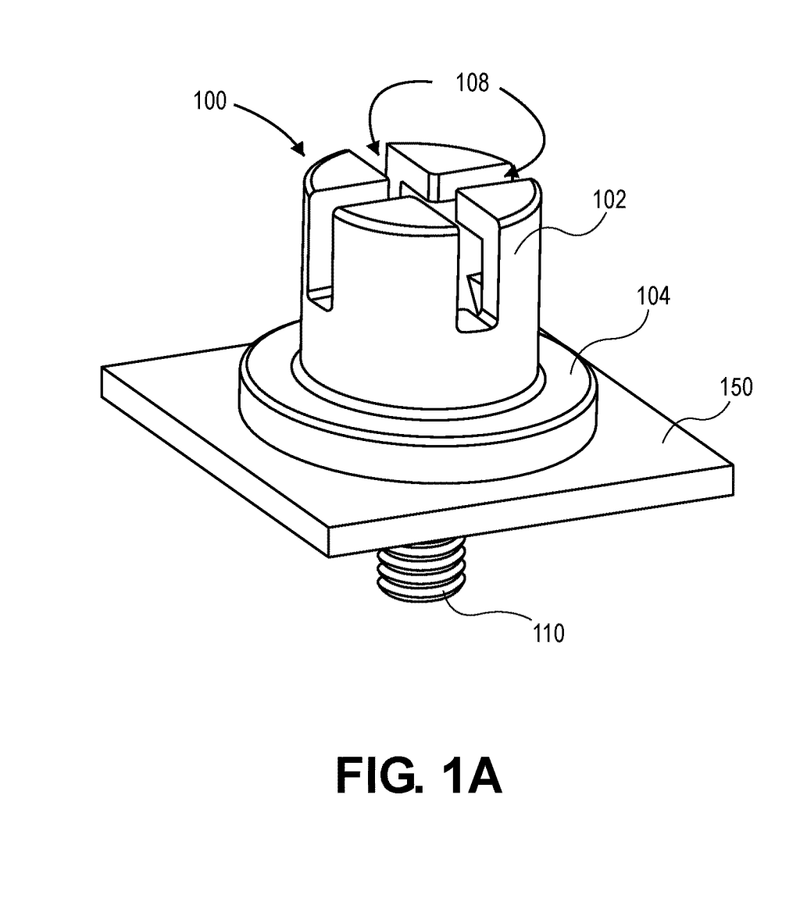
FIG. 1A is a perspective view illustrating a flexible fastener captivator assembly, according to an embodiment.
Figure 1B:
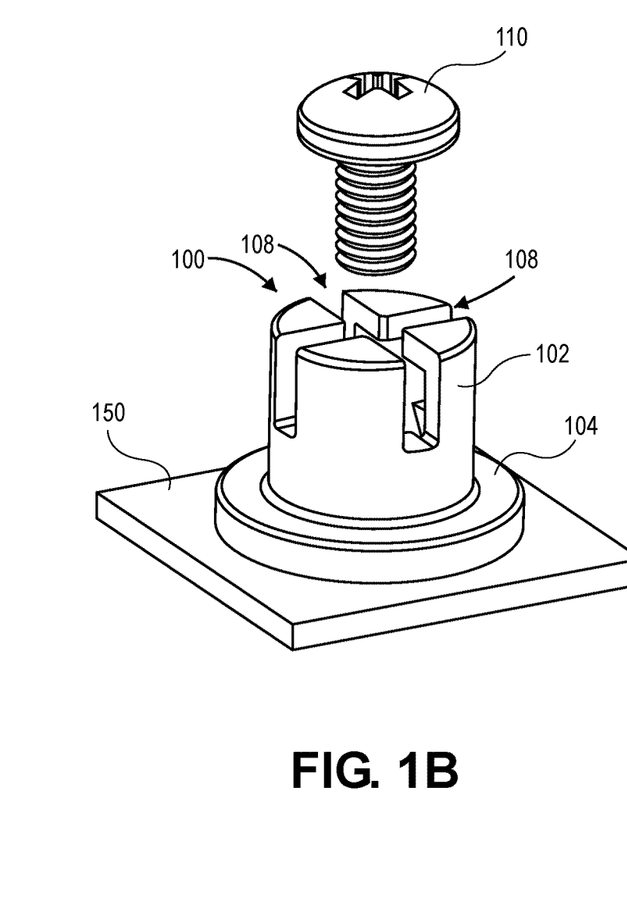
FIG. 1B is a semi-exploded view illustrating the captivator assembly of FIG. 1A, according to an embodiment.
Figure 1C:
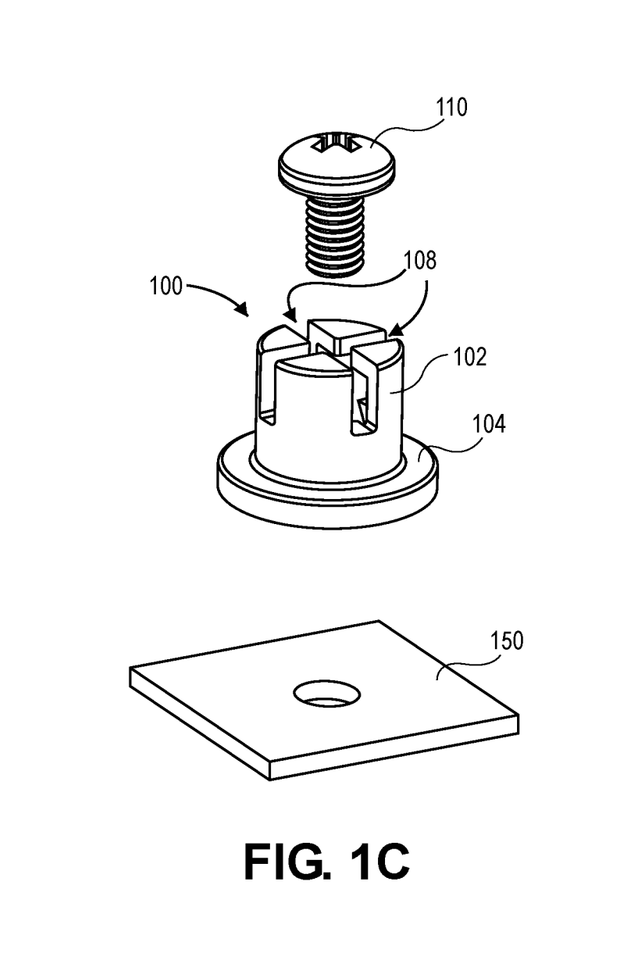
FIG. 1C is an exploded view illustrating the captivator assembly of FIG. 1A, according to an embodiment.
Figure 1D:
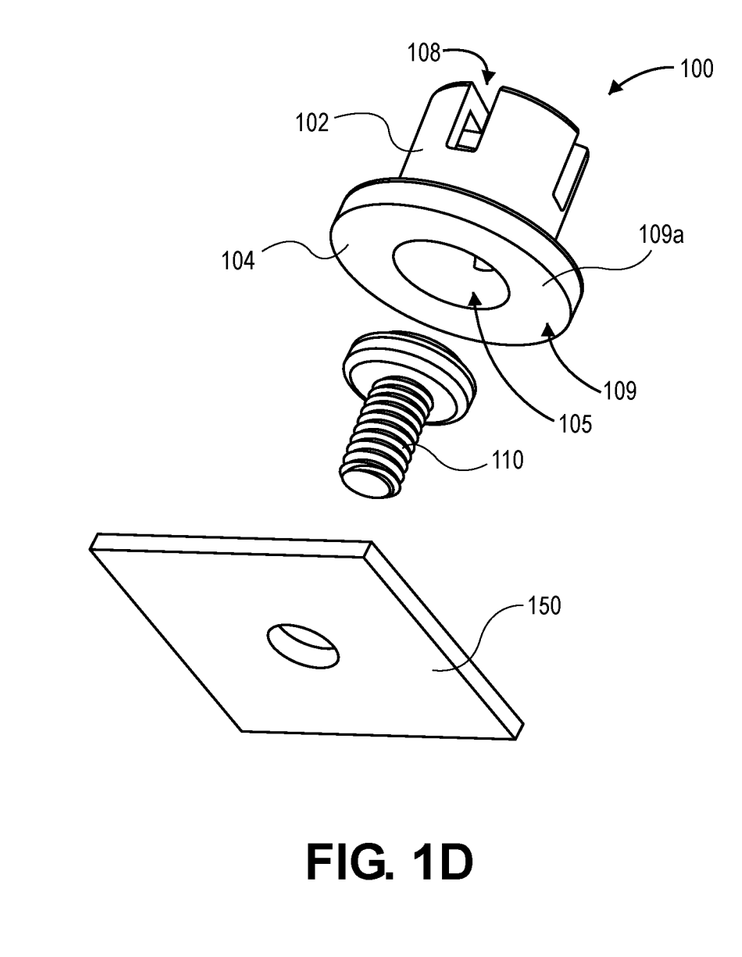
FIG. 1D is another exploded view illustrating the captivator assembly of FIG. 1A, according to an embodiment.
Figure 1E:
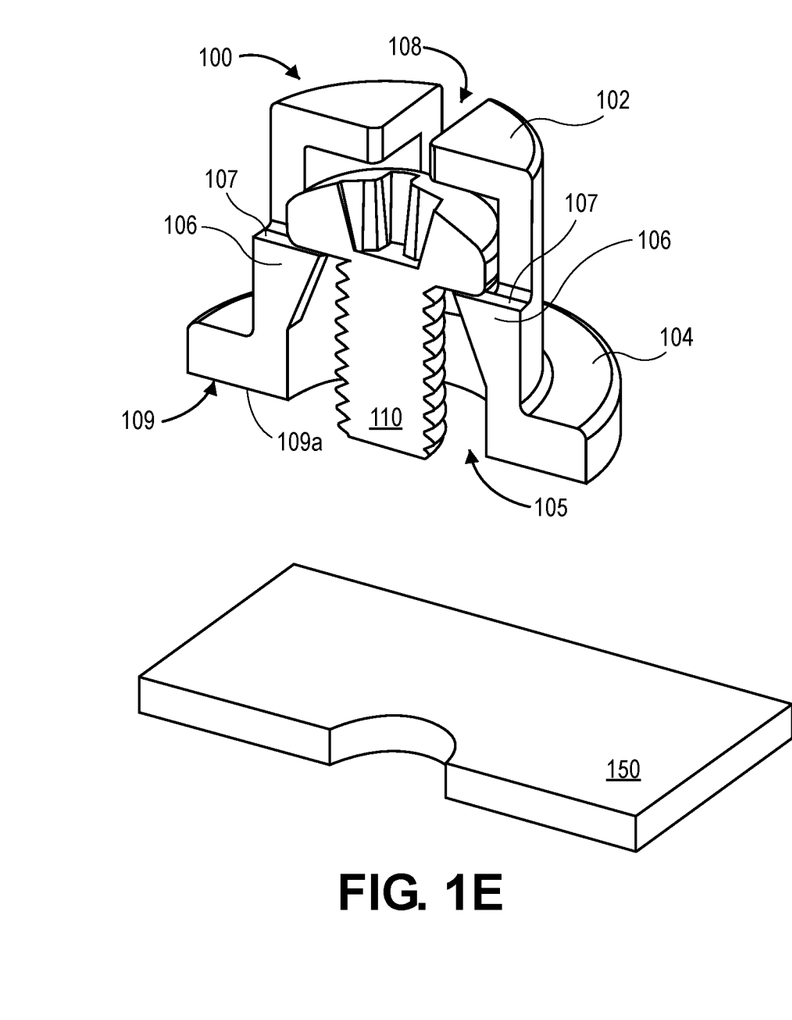
FIG. 1E is a cross-sectional perspective view illustrating the captivator assembly of FIG. 1A, according to an embodiment.
Figure 1F:
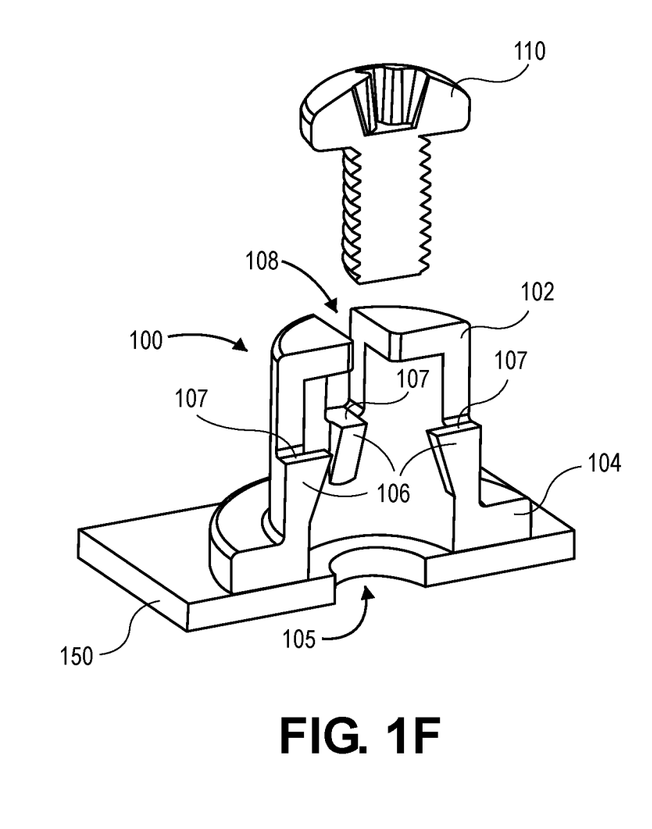
FIG. 1F is a cross-sectional perspective view illustrating the captivator assembly of FIG. 1B, according to an embodiment.

FIG. 1A is a perspective view illustrating a flexible fastener captivator assembly, FIG. 1B is a semi-exploded view illustrating the captivator assembly of FIG. 1A, FIG. 1C is an exploded view illustrating the captivator assembly of FIG. 1A, FIG. 1D is another exploded view illustrating the captivator assembly of FIG. 1A, FIG. 1E is a cross-sectional perspective view illustrating the captivator assembly of FIG. 1A, and FIG. 1F is a cross-sectional perspective view illustrating the captivator assembly of FIG. 1B, all according to an embodiment.

Fastener captivator 100 (simply "captivator 100") comprises a flange 104 comprising an orifice 105 configured to enable or allow a separate fastener 110 to pass through an adhesive side 109 or surface including an adhesive 109a, and a flexible cap 102 coupled with the flange 104, the cap 102 configured to provide operational access to a fastener 110 encapsulated within the cap 102. The adhesive 109a that is coated or otherwise applied to the adhesive side 109 or surface of the flange 104 provides for adhering, affixing, or otherwise securing the captivator 100 to a separate workpiece 150 (not part of embodiments), such as a mounting, assembly, installation bracket (generally, a substrate or "component"; see, e.g., bracket 500 of FIG. 5). Hence, such a component may be shipped, transported, or otherwise moved around with one or more captivators 100 adhered thereto with a fastener 110 captivated therein. For a non-limiting example, a pressure-sensitive adhesive (PSA) may be implemented for use as the adhesive 109a on adhesive side 109 of flange 104. Workpiece 150 is a reference to any and all types of materials that may be assembled or coupled together by way of one or more fasteners, and a suitable adhesive 109a may vary from implementation to implementation and thus may be selected for use in adhering to a respective type of material workpiece 150.

The flexibility of the cap 102 provides for functionality of the captivator 100 as described herein. For example and according to an embodiment, the cap 102 is elastomeric, e.g., composed of an elastomer or viscoelastic polymer with a relatively low Young's modulus and high failure strain compared with other materials. For non-limiting examples, cap 102, and/or cap 102 and flange 104, is/are composed of TPE (thermoplastic elastomer), TPV (thermoplastic Vulcanisate), TPU (thermoplastic polyurethane), flexible PVC (polyvinyl chloride), and the like. According to an embodiment, the separate fastener 110 is largely encapsulated entirely within the cap 102 and flange 104. Stated otherwise, the captivator 100 is configured so that at least a majority of the fastener 110 is encapsulated and enveloped by and extends through the cap 102 and flange 104, i.e., without captivating or housing the fastener 110 such that the fastener head protrudes outside the top of the cap 102. According to an embodiment, the flange 104 is annular in form, as depicted throughout the figures illustrating a singular captivator 100 such as in FIGS. 1A-3B. According to an embodiment, the cap 102 is cylindrical in form as also depicted throughout the figures.

According to an embodiment, the cap 102 comprises a retaining structure within, where the retaining structure is configured to hold a separate fastener 110 within the cap 102. As such, the retaining structure is configured to prevent the fastener 110 from inadvertently or unintentionally passing out of the captivator 100 through the flange 104, in conjunction with the top of the cap 102 which prevents the fastener 110 from inadvertently or unintentionally passing through the top of the cap 102. Hence, once inserted into the captivator 100 a fastener 110 is retained or "captivated" within the captivator 100 and, therefore, prevented from being lost, dropped, and the like. According to an embodiment, the retaining structure comprises a plurality of flexible ledges 106 (FIGS. 1E-1F, 2A-2B, 3A) extending from an inner surface of the cap 102 and having a substantially planar surface 107 (FIGS. 1E-1F, 2A-2B, 3A-3B) configured to support a head of a separate inserted fastener 110. Captivator 100 is generally intended for use with virtually any type and form of fastener having a head, e.g., any standard or non-standard specialized screw or bolt (including readily available and low cost "off-the-shelf" fasteners), and a corresponding captivator can be designed and dimensioned commensurate with the fastener type and size for which its use is intended.

According to an embodiment, the cap 102 further comprises a plurality of intersecting notches 108 (FIGS. 1A-1F, 2A, 3B) extending from a top surface of the cap 102 toward the flange 104, and separating flexible structures therebetween, thereby providing the operational access to a fastener 110 encapsulated within the cap 102, in that a screw driver or other fastener driver tool can access the captivated fastener 110 through the notches 108, as well as for insertion of a fastener 110 through the top surface of the cap 102 for housing and captivating the fastener 110 within the captivator 100. While two perpendicular intersecting notches 108 are depicted in the figures (e.g., a plus "+" shape), which results in four cap 102 sidewall cutouts, the number and positioning of notches 108 may vary from implementation to implementation. According to an embodiment, the planar surface 107 of each of the plurality of flexible ledges 106 are positioned substantially in plane or coincident with a bottom edge of each of the plurality of notches 108 (best viewed in FIGS. 1F, 2A, 3A), thereby providing a combination of structures (i.e., the ledges 106 and the notches 108) that facilitate the foregoing functionalities.

Figure 2A:
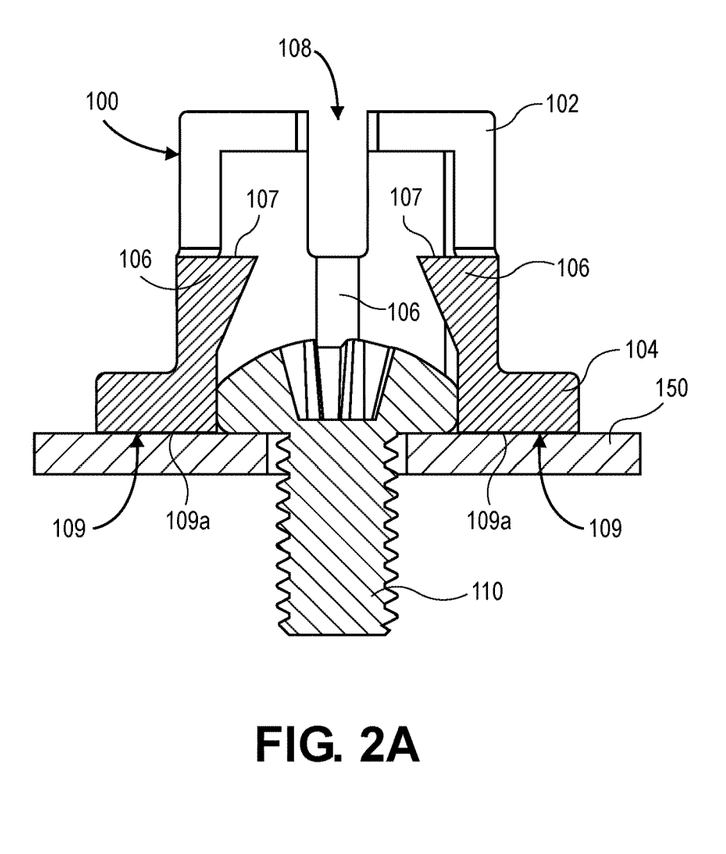
FIG. 2A is a cross-sectional side view illustrating the captivator assembly of FIG. 1A with installed fastener, according to an embodiment.

FIG. 2A is a cross-sectional side view illustrating the captivator assembly of FIG. 1A with installed fastener, according to an embodiment. Here, a fastener captivator 100 as described in reference to FIGS. 1A-1F is shown adhered to a workpiece 150 via adhesive 109a on adhesive side 109 or surface of flange 104. FIG. 2A further depicts the fastener 110 screwed into, fastened to, or otherwise installed with workpiece 150, thereby illustrating operational functionality of captivator 100.

Figure 2B:
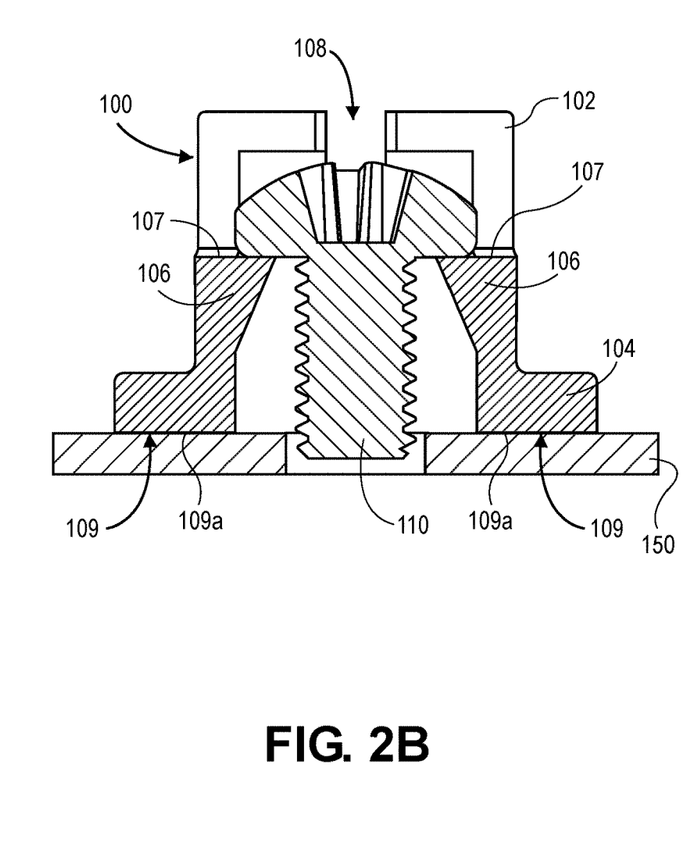
FIG. 2B is a cross-sectional side view illustrating the captivator assembly of FIG. 1A with retracted fastener, according to an embodiment.

FIG. 2B is a cross-sectional side view illustrating the captivator assembly of FIG. 1A with retracted fastener, according to an embodiment. Here, the fastener captivator 100 as described in reference to FIGS. 1A-1F is shown adhered to a workpiece 150 via adhesive 109a on adhesive side 109 or surface of flange 104, but with the fastener 110 retracted from the workpiece 150 while captivated within the captivator 100, i.e., being supported or held by or seated on planar surface 107 of each of the plurality of flexible ledges 106 of cap 102. As such, fastener 110 is captive within the captivator 100 while being accessible to a tool via the intersecting notches 108, for installing into the workpiece 150 such as depicted in FIG. 2A. Thus, FIG. 2A further illustrates operational functionality of captivator 100.

Figure 3A:
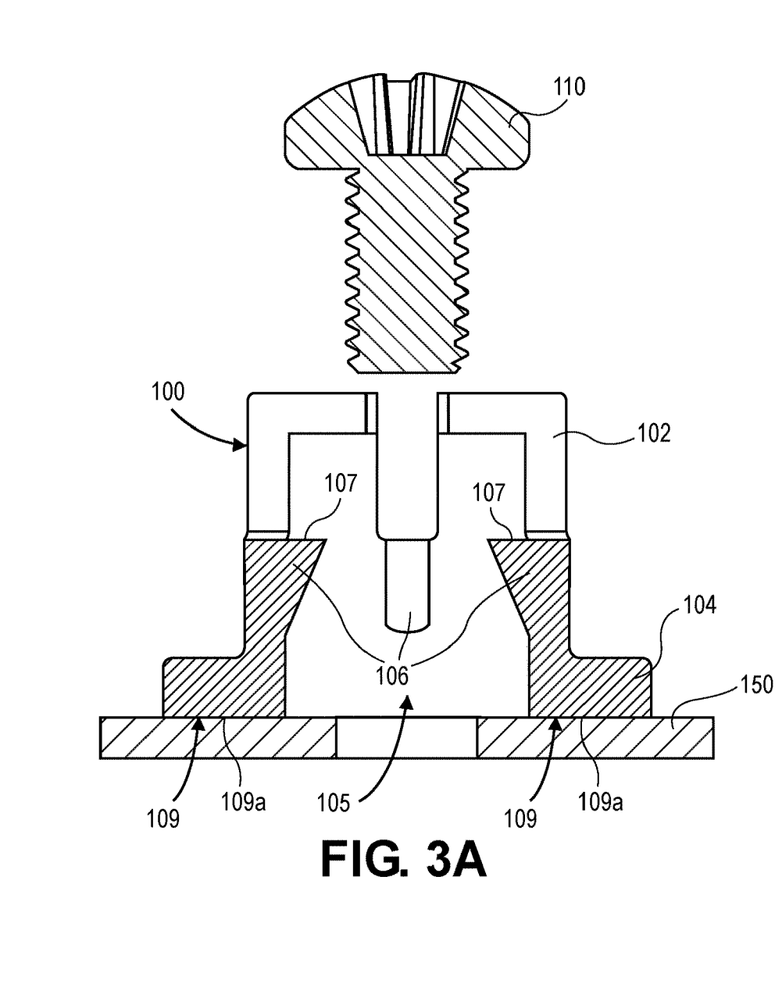
FIG. 3A is a cross-sectional side view illustrating a first manner of assembly for a flexible captivator assembly, according to an embodiment.
Figure 3B:
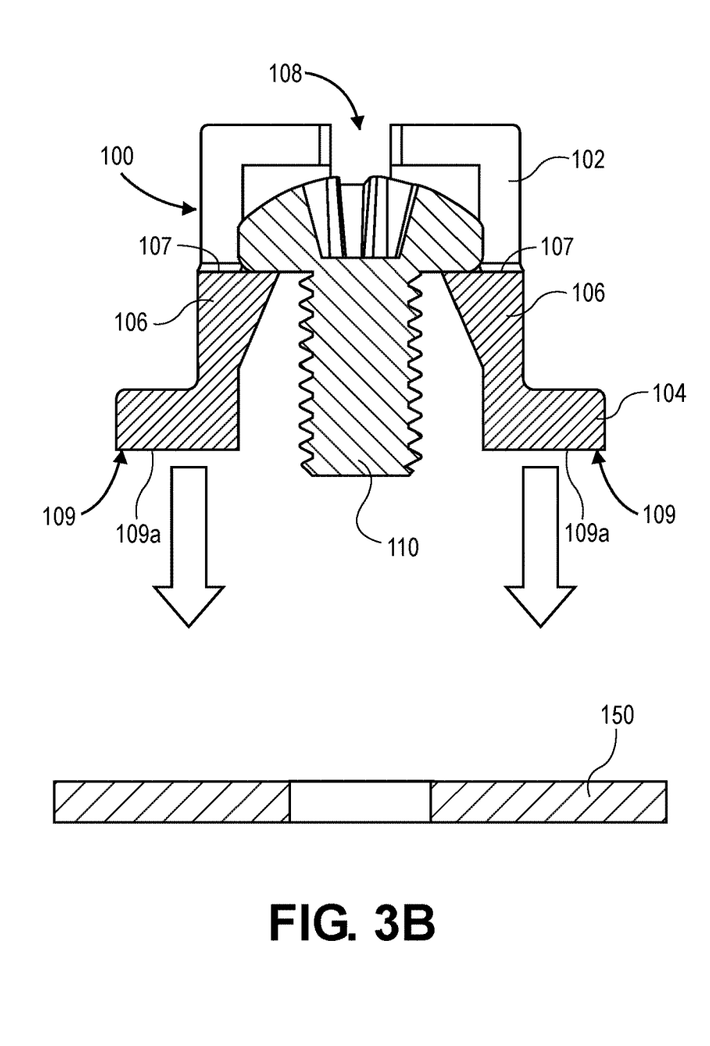
FIG. 3B is a cross-sectional side view illustrating a second manner of assembly for a flexible captivator assembly, according to an embodiment.

There are multiple ways in which a separate fastener may be inserted into and thereby captively utilized with a fastener captivator 100 such as described in reference to FIGS. 1A-1F. FIG. 3A is a cross-sectional side view illustrating a first manner of assembly for a flexible captivator assembly, and FIG. 3B is a cross-sectional side view illustrating a second manner of assembly for a flexible captivator assembly, both according to respective embodiments. FIG. 3A depicts a fastener captivator 100 that is first adhered to a workpiece 150 via adhesive 109a on adhesive side 109 or surface of flange 104, prior to insertion or forcing of a corresponding fastener 110 from the top of cap 102 through the notches 108 and into the cavity within cap 102, such as by temporarily deforming or moving the flexible structures between the notches 108, to come to support or seat on the planar surfaces 107 of the plurality of flexible ledges 106 of cap 102. Alternatively, FIG. 3B depicts a fastener captivator 100 in which a corresponding fastener 110 is first inserted (i) from the top of cap 102 through the notches 108 or (ii) from the bottom of cap 102 through the corresponding flange 104, and into the cavity within cap 102, to come to support or seat on the planar surfaces 107 of the plurality of flexible ledges 106 of cap 102. Thus, the fastener is thereby held in place or captivated within the cap 102 of the captivator 100, which can now be adhered to a workpiece 150 via adhesive 109a on adhesive side 109 or surface of flange 104.

Flexible Fastener Captivator Strip

Figure 4A:
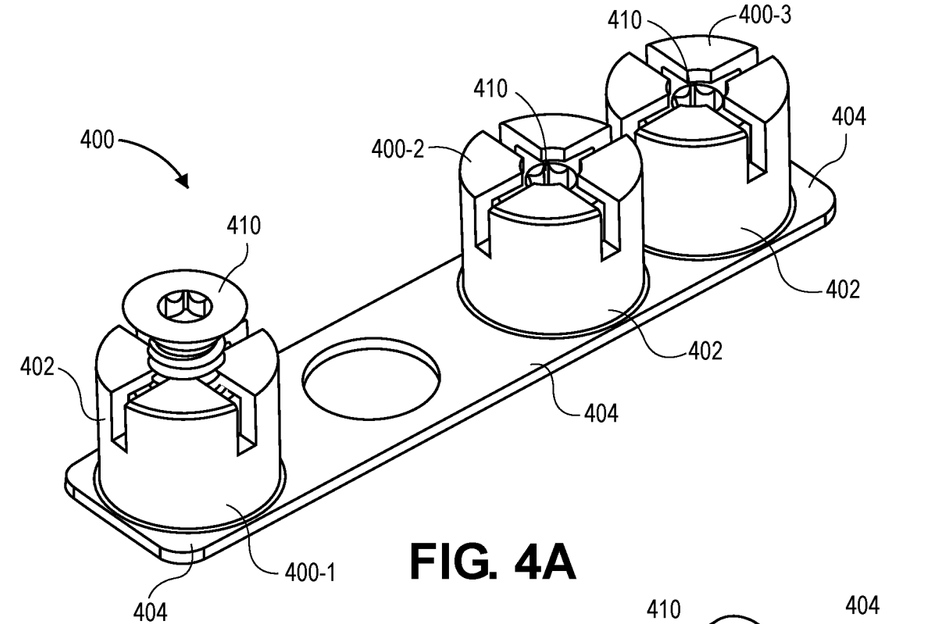
FIG. 4A is a perspective view of a unitary multiple flexible fastener assembly, according to an embodiment.
Figure 4B:
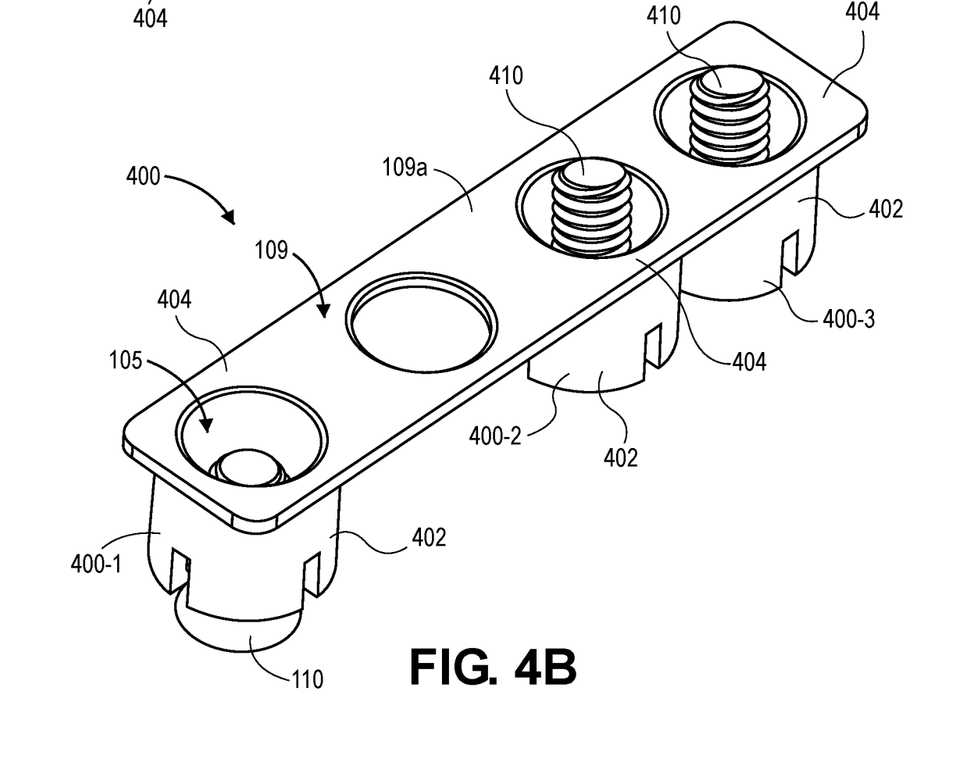
FIG. 4B is another perspective view of the unitary multiple flexible fastener assembly of FIG. 4A, according to an embodiment.

FIG. 4A is a perspective view of a unitary multiple flexible fastener assembly, and FIG. 4B is another perspective view of the unitary multiple flexible fastener assembly of FIG. 4A, both according to an embodiment. According to an embodiment, a unitary multiple flexible fastener assembly, also referred to herein as a flexible fastener captivator strip 400 (or simply "captivator strip 400"), comprises a plurality of flexible caps 402 coupled together with a continuous or contiguous series of corresponding flanges 404, as a singular or unitary part. Each cap 402 may be implemented the same as or similar to cap 102 illustrated and described in reference to FIGS. 1A-1F, and each flange 404 may be implemented the same as or similar to cap 104 illustrated and described in reference to FIGS. 1A-1F, to which reference is made for like numbers corresponding to like structures. Here, each respective captivator 400-1, 400-2, 400-3 comprising a cap 402 and flange 404 is configured to captivate a corresponding fastener 410 the same as or similarly to how captivator 100 captivates fastener 110 as described elsewhere herein. Captivator 400 can support retention of multiple fasteners on a common hole-to-hole center distance and/or can be custom-molded for multiple fasteners with varying hole to hole center distance. Furthermore and as depicted, a non-uniform spacing between adjacent captivators 400-1, 400-2, 400-3 may be implemented according to particular needs. As with the adhesive side 109 of captivator 100, the strip or series of flanges 404 likewise comprises an adhesive side 109 with an adhesive 109a thereon.

Figure 5:
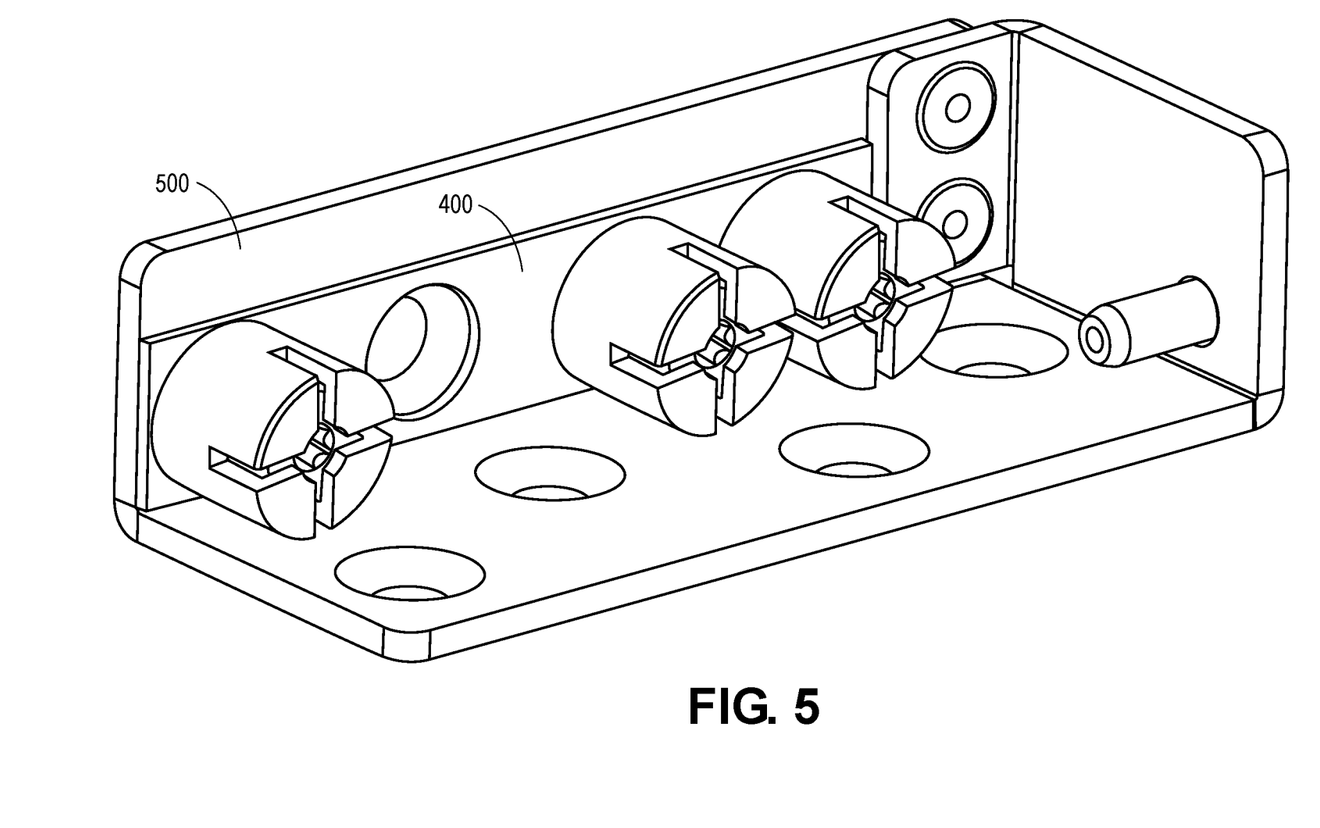
FIG. 5 is a perspective view of the unitary multiple flexible fastener assembly of FIG. 4A adhered to a mounting bracket, according to an embodiment.

FIG. 5 is a perspective view of the unitary multiple flexible fastener assembly of FIG. 4A adhered to a mounting bracket, according to an embodiment. The assembly of FIG. 5 illustrates how a captivator strip 400 may be used with a bracket 500, for a non-limiting example use. Here, the captivator strip is pre-assembled or pre-installed onto the bracket 500, with fasteners 410 (FIGS. 4A-4B) captivated therein, via the adhesive 109a (FIG. 4B). Such a bracket 500 assembly may then be shipped or otherwise transported or moved around, by itself such as in an installation kit or as part of a larger assembly, where the fasteners 410 are captivated within each respective captivator 400-1, 400-2, 400-3 (FIGS. 4A-4B) and therefore with little risk to losing any of the fasteners 410 during movement of the bracket 500. Furthermore, the bracket 500 is prepared for final installation with a mating part by driving the fasteners 410 into the mating part. Still further, any of the fasteners 410 can be readily replaced if necessary, e.g., by removing and replacing through the top of the relevant captivator 400-1, 400-2, 400-3, such as if damaged during transport or assembly for example.

Figure 6A:
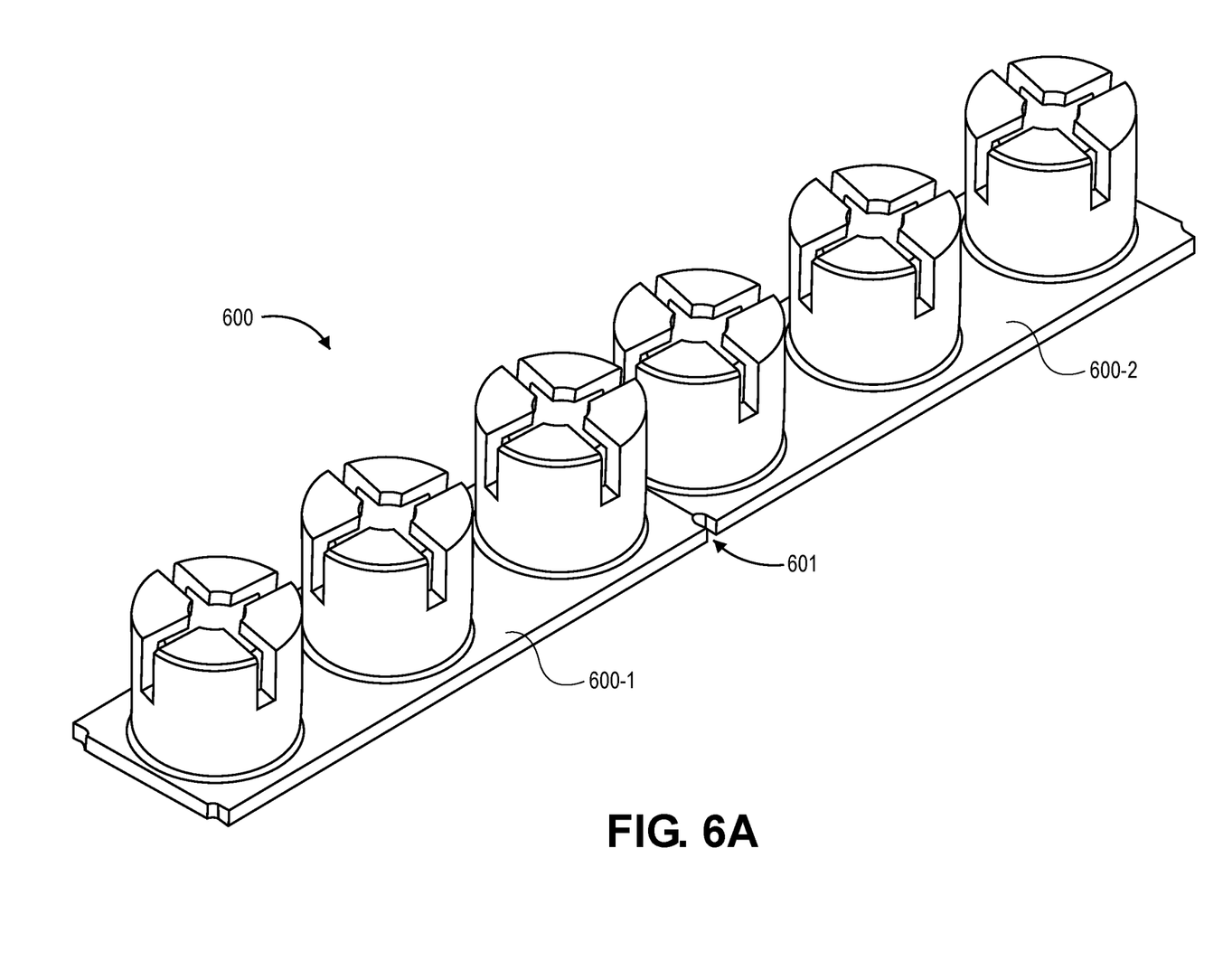
FIG. 6A is a perspective view of a flexible fastener captivator strip, according to an embodiment.
Figure 6B:
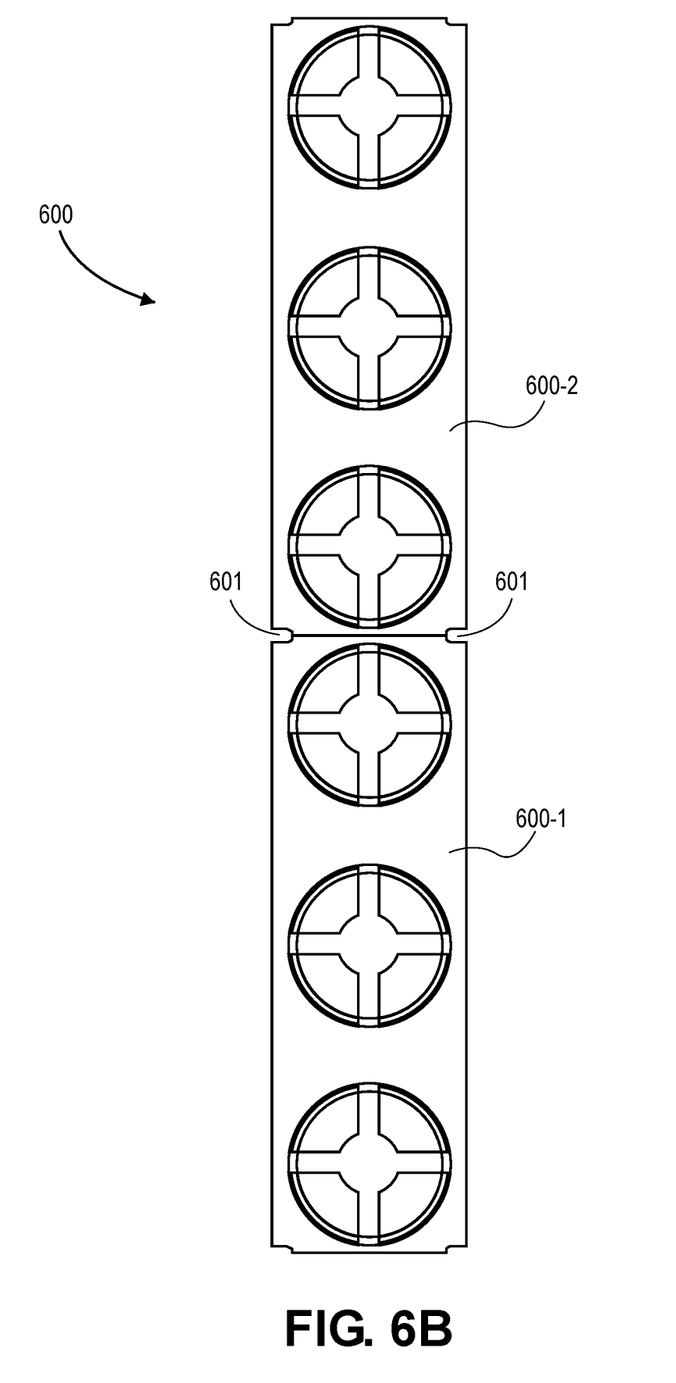
FIG. 6B is a top view of the flexible fastener captivator strip of FIG. 6A, according to an embodiment.

FIG. 6A is a perspective view of a flexible fastener captivator strip, and FIG. 6B is a top view of the flexible fastener captivator strip of FIG. 6A, according to an embodiment. The Electronic Industries Association (EIA) specifies features of what may be considered a "standard rack". Specification EIA-310, for example, standardizes several important features of 19" (inch) racks, such as the Rack Unit (RU or U), vertical hole spacing, horizontal hole spacing, rack opening and front panel width. For example, one Rack Unit (1 U) corresponds to three fasteners (e.g., bolts), or three fastener receptacles, having a centerline spacing of 0.625 inches apart with the total 1 U fastener configuration being 1.750 inches from end to end. Thus, the vertical hole spacing is defined as a repeating pattern of holes within one Rack Unit of 1.750 inches, where the entire spacing alternates at ½" and then repeats.

Flexible fastener captivator strip 600 (or simply "captivator strip 600") comprises a series of flexible fastener captivator strips 600-1, 600-2, separated by a trimming index 601 on one or both sides of the captivator strip 600, at certain intervals. Each trimming index 601 may comprise a notch in the base or flange material (see, e.g., flange(s) 404 of FIGS. 4A-4B), possibly with an additional crease or material indentation therebetween, where the trimming index 601 can be implemented to trim to known lengths, such as between Rack Units of length. For purposes of example, the captivator strip 600 depicted in FIGS. 6A-6B is a "2 U" strip, however the configuration may vary from implementation to implementation based on needs. As such, captivator strips 600 may be constructed in units of "U" such as 2 U (shown), 3 U, 4 U and so on. Indeed, a continuous reel, roll, or spool of fastener captivators such as captivators 600-1, 600-2 having trimming indices 601 may be manufactured, which can then be trimmed on site to the overall number of fasteners needed.

Method of Use of a Flexible Fastener Captivator

Figure 7:
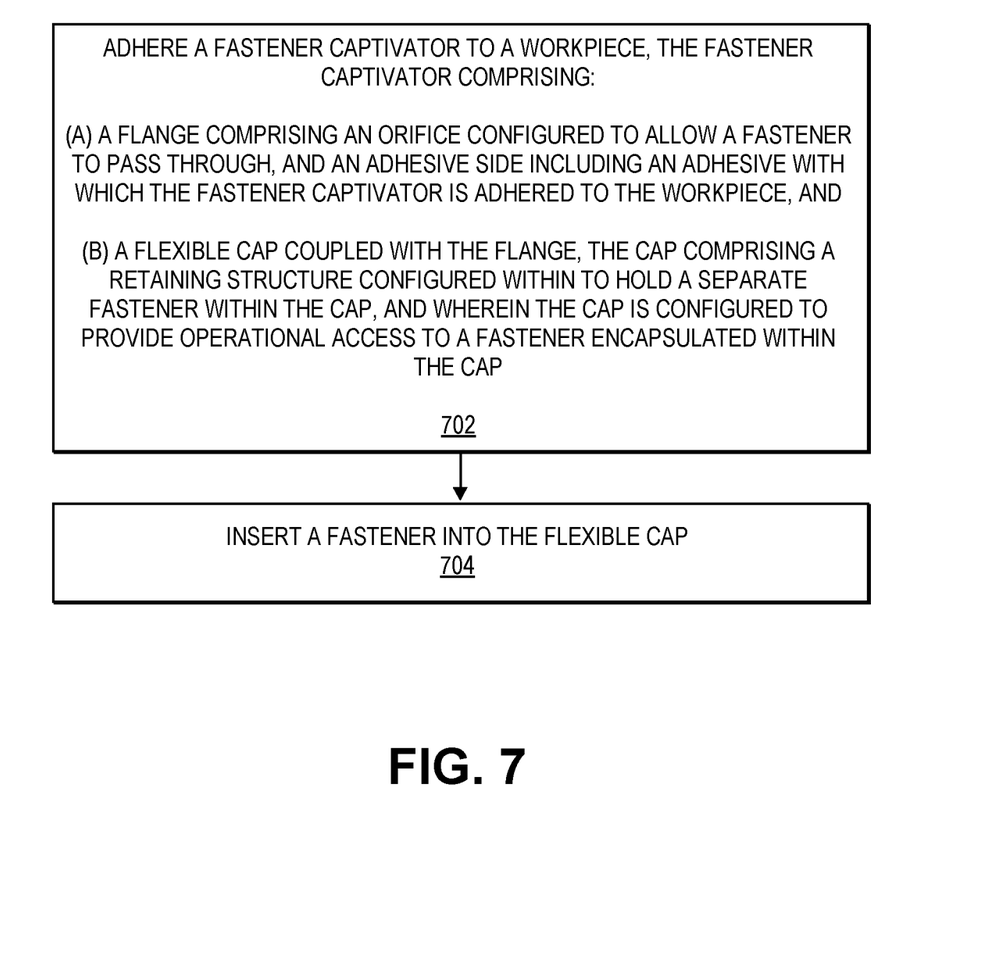
FIG. 7 is a flow diagram illustrating a method of use, according to an embodiment.

FIG. 7 is a flow diagram illustrating a method of use, according to an embodiment. The method of FIG. 7 may be used with any and all of the various flexible fastener captivators illustrated and described herein (e.g., captivator 100 of FIGS. 1A-3B, captivator strip 400 of FIGS. 4A-5, captivator strip 600 of FIGS. 6A-6B), and equivalents and variants thereof.

At block 702, a fastener captivator is adhered to a workpiece, where the fastener captivator comprises (A) a flange comprising an orifice configured to enable or allow a fastener to pass through, and an adhesive side including an adhesive with which the fastener captivator is adhered to the workpiece, and (B) a flexible cap coupled with the flange, the cap comprising a retaining structure configured within to hold a separate fastener within the cap, and wherein the cap is configured to provide operational access to a fastener encapsulated within the cap. For example, fastener captivator 100, captivator strip 400, captivator strip 600 is adhered to workpiece 500 (FIG. 5) by adhesive 109a of adhesive side 109 of flange 104, 404.

At block 704, a fastener is inserted into the flexible cap. For example, one or more fastener 110, 410 is inserted into a corresponding cap 102, 402 of the captivator 100, captivator strip 400, captivator strip 600.

Unless specifically stated, embodiments are not necessarily limited to the particular order of the blocks of FIG. 7. For example, and as illustrated and described in reference to FIGS. 3A-3B, there are multiple ways in which a separate fastener may be inserted into and thereby captively utilized with a corresponding fastener captivator. For example (see, e.g., FIG. 3A) a fastener captivator 100, captivator strip 400, captivator strip 600 is first adhered to a workpiece via adhesive (e.g., block 702) prior to insertion of a corresponding fastener (e.g., block 704) from the top of the cap through the notches and into the cavity within cap. Alternatively (see, e.g., FIG. 3B), a fastener is first inserted (e.g., block 704) (i) from the top of cap through the notches or (ii) from the bottom of cap through the corresponding flange and into the cavity within cap, before fastening the fastener captivator 100, captivator strip 400, captivator strip 600 to a workpiece via the adhesive (e.g., block 702).

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A fastener captivator comprising:
   a flange comprising an orifice configured to enable a fastener to pass through, and an adhesive side including an adhesive; and
   a flexible cap coupled with the flange, the cap configured to provide operational access to a fastener when encapsulated within the cap, wherein the cap comprises:
      a retaining structure positioned within, the retaining structure configured to hold the fastener when encapsulated within the cap, and
      wherein the retaining structure comprises a plurality of intermittent flexible ledges extending from an inner surface of the cap, each flexible ledge comprising a substantially planar and normal surface to the inner surface and configured to support a head of the fastener when encapsulated within the cap.

2. The fastener captivator of claim 1, wherein the flange is annular in form.

3. The fastener captivator of claim 1, wherein the cap is cylindrical in form.

4. The fastener captivator of claim 1, wherein:
   the flange is annular; and
   the cap is cylindrical.

5. The fastener captivator of claim 1, wherein the cap further comprises a plurality of notches extending from a top surface of the cap toward the flange.

6. The fastener captivator of claim 1, wherein the cap further comprises:
   a plurality of notches extending from a top surface of the cap toward the flange;
   wherein the planar surface of each ledge of the plurality of flexible ledges is positioned substantially in plane with a bottom edge of each notch of the plurality of notches.

7. The fastener captivator of claim 1, further comprising a series of the flexible caps coupled together with a contiguous series of the flanges.

8. The fastener captivator of claim 7, further comprising multiple series of the flexible caps coupled together with the contiguous series of the flanges.

9. The fastener captivator of claim 8, further comprising one or more trimming index between each series of the multiple series.

10. The fastener captivator of claim 1, wherein each flexible ledge extends at an acute angle upward from the inner surface of the cap to the planar and normal surface.

11. A method comprising:
   positioning a fastener captivator to a workpiece, the fastener captivator comprising:
      a flange comprising an orifice configured to enable a fastener to pass through, and an adhesive side including an adhesive with which the fastener captivator is configured to adhere to the workpiece, and
      a flexible cap coupled with the flange, the cap comprising a retaining structure configured within to hold a fastener when within the cap, wherein the retaining structure comprises a plurality of intermittent flexible ledges extending from an inner surface of the cap, each flexible ledge comprising a substantially planar and normal surface to the inner surface and configured to support a head of a fastener when encapsulated within the cap, wherein the cap is configured to provide operational access to a fastener when encapsulated within the cap; and inserting a fastener into the cap.

12. The method of claim 11, further comprising:

prior to inserting the fastener into the cap, adhering the fastener captivator to the workpiece.

13. The method of claim 11, wherein:

the cap of the fastener captivator further comprises a plurality of notches, extending from a top surface of the cap toward the flange, separating flexible structures positioned therebetween; and inserting the fastener into the cap includes temporarily deforming the flexible structures to force the fastener into the cap from a top side of the cap.

14. The method of claim 13, wherein:

the planar surface of each ledge of the plurality of flexible ledges is positioned substantially in plane with a bottom edge of each notch of the plurality of notches; and inserting the fastener into the cap includes seating the fastener onto the planar surface of each ledge.

15. The method of claim 11, further comprising:

after inserting the fastener into the cap, adhering the fastener captivator to the workpiece.

16. The method of claim 11, wherein:

inserting the fastener into the cap includes seating the fastener onto the retaining structure.

17. The method of claim 11, wherein:

the fastener captivator comprises a series of the flexible caps coupled together with a contiguous series of the flanges; and inserting a fastener into the cap further includes inserting a plurality of the fasteners each into a respective one of the series of caps.

* * * * *